United States Patent [19]

Hamling et al.

[11] 4,065,544

[45] Dec. 27, 1977

[54] FINELY DIVIDED METAL OXIDES AND SINTERED OBJECTS THEREFROM

[75] Inventors: Bernard H. Hamling, Warwick; Alfred W. Naumann, Monsey, both of N.Y.

[73] Assignee: Union Carbide Corporation, New York, N.Y.

[21] Appl. No.: 481,321

[22] Filed: June 20, 1974

Related U.S. Application Data

[63] Continuation-in-part of Ser. No. 264,040, June 19, 1972, abandoned, which is a continuation-in-part of Ser. No. 36,442, May 11, 1970, abandoned.

[51] Int. Cl.$^2$ .................. C01F 15/00; C01I 17/00; C01F 7/02; C01G 1/02

[52] U.S. Cl. .................. 423/252; 252/301.1 R; 264/0.5; 264/56; 423/3; 423/21; 423/23; 423/49; 423/53; 423/62; 423/69; 423/87; 423/89; 423/99; 423/111; 423/138; 423/155; 423/263; 423/604; 423/608; 423/625

[58] Field of Search .................. 264/0.5, 56; 252/301.1 K; 423/2, 3, 252, 250, 260, 263, 608, 604, 628, 21, 23, 49, 52, 62, 69, 87, 89, 99, 111, 138, 155, 625

[56] References Cited

U.S. PATENT DOCUMENTS

| | | | |
|---|---|---|---|
| 2,392,605 | 1/1946 | Miller | 423/608 |
| 2,966,393 | 12/1960 | Kember | 423/6 |
| 2,984,576 | 5/1961 | Alexander et al. | 106/55 |
| 3,303,033 | 2/1967 | La Grange et al. | 106/57 |
| 3,311,481 | 3/1967 | Sterry et al. | 106/57 |
| 3,330,697 | 7/1967 | Pechini | 117/215 |
| 3,385,915 | 5/1968 | Hamling | 264/0.5 |
| 3,417,028 | 12/1968 | Montgomery et al. | 423/628 |
| 3,432,314 | 3/1969 | Mazdiyazni et al. | 106/57 |
| 3,438,723 | 4/1969 | Pechini | 423/263 |
| 3,514,252 | 5/1970 | Levy et al. | 423/608 X |

*Primary Examiner*—Richard E. Schafer
*Attorney, Agent, or Firm*—William Raymond Moran

[57] ABSTRACT

Finely-divided metal oxides are prepared by the steps of (a) contacting a compound of a metal with a carbohydrate material to obtain an intimate mixture thereof, (b) igniting this mixture to oxidize the same and to insure conversion of substantially all of said metal compound to a fragile agglomerate of its metal oxide, and (c) pulverizing the product of step (b) to form a finely-divided metal oxide powder having a mean particle size below about 1.0 micron. Certain of the finely-divided metal oxide powders produced by this process have the useful property of sinterability at temperatures significantly lower than metal oxide powders heretofore readily available. The powders are useful in the preparation of high strength compacted shapes for use in high temperature and/or corrosive environment, in the preparation of refractory cements, catalysts, catalysts supports and the like.

36 Claims, 7 Drawing Figures

FINELY DIVIDED METAL OXIDES AND SINTERED OBJECTS THEREFROM

This application is a continuation-in-part of U.S. patent application Ser. No. 264,040 entitled "Finely Divided Metal oxides and Sintered Objects Therefrom", filed June 19, 1972 by B. H. Hamling and A. W. Naumann and now abandoned. Ser. No. 264,040 is in turn a continuation-in-part of Ser. No. 36,442, of the same title and by the same inventors, filed May 11, 1970, now abandoned.

This invention relates to a process for the preparation of finely divided metal oxides, to the metal oxide powders produced by the process of the invention, and to high strength and/or high surface area sintered metal oxide bodies prepared from them.

The prior art has disclosed various methods for producing finely-divided metal oxides such as zirconia. For instance, one method is disclosed by Mazdiyasni et al. in U.S. Pat. No. 3,432,314 and J. Am. Ceram. Soc., 50, page 532 (October 1967). This method consists in precipitating zirconia from a solution of high purity zirconium alkoxide. Simultaneously with the precipitation of zirconia, a stabilizer oxide is also coprecipitated with the zirconia. The finely-divided zirconia produced by Mazdiyasni et al. by this co-precipitation technique is first dried, calcined, and then crushed to a fine powder. The fine powder can be pressed to produce a shaped body, which is then sintered at a temperature of at least 1450° C.

Other methods for making ultra-fine particle size zirconia include the method known as the Sol-Gel process (R. G. Wymer et al, Proc British Ceram. Soc., 7, 61, 1967), spray drying (B. Bovarnick et al, U.S. Pat. No. 3,305,349), and freeze-drying (Schnettler et al., Sci. Ceram. 4, 79, 1967).

In the work reported by T. Vasilos et al in "Ultrafine-Grain Ceramics, Proceedings of the 15th Sagamore Army Materials Research Conference, August 1968", Syracuse University Press (1970), the very fine particles that remained in suspension after repeated centrifugation of Mazdiyasni et al. type zirconia powder were cast into a disc having a green density of 72 percent of theoretical and then sintered. Substantially fully dense zirconia was prepared at a sintering temperature of only 1300° C, however, the specimens cracked during the experiment. Such a method for producing ultra-fine particles would clearly be prohibitively expensive since yields of the order of a fraction of one percent would be expected.

Sintering temperatures of "1100°–1500° C" to product zirconia of at least 90 percent of theoretical density are reported for zirconia powder produced by a fluid energy mill (ref. — British Pat. No. 1,177,596).

The present invention is based upon the discovery that ultra-fine metal oxide powders can be prepared by a relatively uncomplicated and inexpensive method. Many of the powders that are produced by this method can be sintered essentially to their theoretical densities at relatively low temperatures, that is, temperatures significantly lower than those employed in the prior art. By the process of this invention it is also possible to form intimate mixtures of oxides and compounds without high temperature treatment. The method of the invention comprises first contacting one or more metal compounds with a carbohydrate material, igniting the material to decompose and remove the carbohydrate material and to insure conversion of substantially all of said metal compounds to fragile agglomerates of its metal oxide, followed by communication of the thus formed agglomerates to give the uniform, ultra-fine powders of this invention.

By the term "metal oxide" as employed in the specification and appended claims is meant a compound or compounds consisting of one or more metals and oxygen. Examples of metal oxides which can be prepared include such compounds as 1. $TiO_2$
2. Zirconia-yttria solid solution
3. Barium titanate
4. Mixtures of compounds or oxides such as zirconia-chromia.

By the term "comminution", "disruption" or "pulverizing" as used throughout the specification and appended claims is meant the separation of the individual particles which form the agglomerate without the need for further subdivision or fracturing of the particles. Hence any method which can achieve this end can be employed. However, from a practical viewpoint it has been found that wet ball milling accomplishes this best.

One of the advantages of this method is that the particles prepared by this dispersive precursor method, and which make up the agglomerate are already of the proper size and uniformity. Thus, since the powders produced by this method have an extremely small and uniform particle size, they can be sintered to form useful high strength pressed bodies at relatively low sintering temperatures.

A clearer understanding of the invention will be had by reference to the accompanying drawings.

With reference to the drawings, FIGS. 1, 2 and 3 are sintering curves of three different samples of pellets prepared from zirconia powders. FIGS. 4, 5, 6 and 7 are pictures obtained by scanning electron microscopy of commercially available zirconia powders and zirconia powders prepared by the process of this invention.

FIG. 1 is a sintering curve obtained on an Orton Automatic Recording Dilatometer of −325 mesh (U.S. Standard) yttria stabilized zirconia powder supplied by the Zirconia Corporation of America. The change in length, $\Delta L/L$, in arbitrary units is plotted against temperature in degrees centigrade. As indicated in Example 5, after compacting and sintering at the time and temperature indicated, the pellets had a density of 3.9 grams per cubic centimeter.

Figure 1:
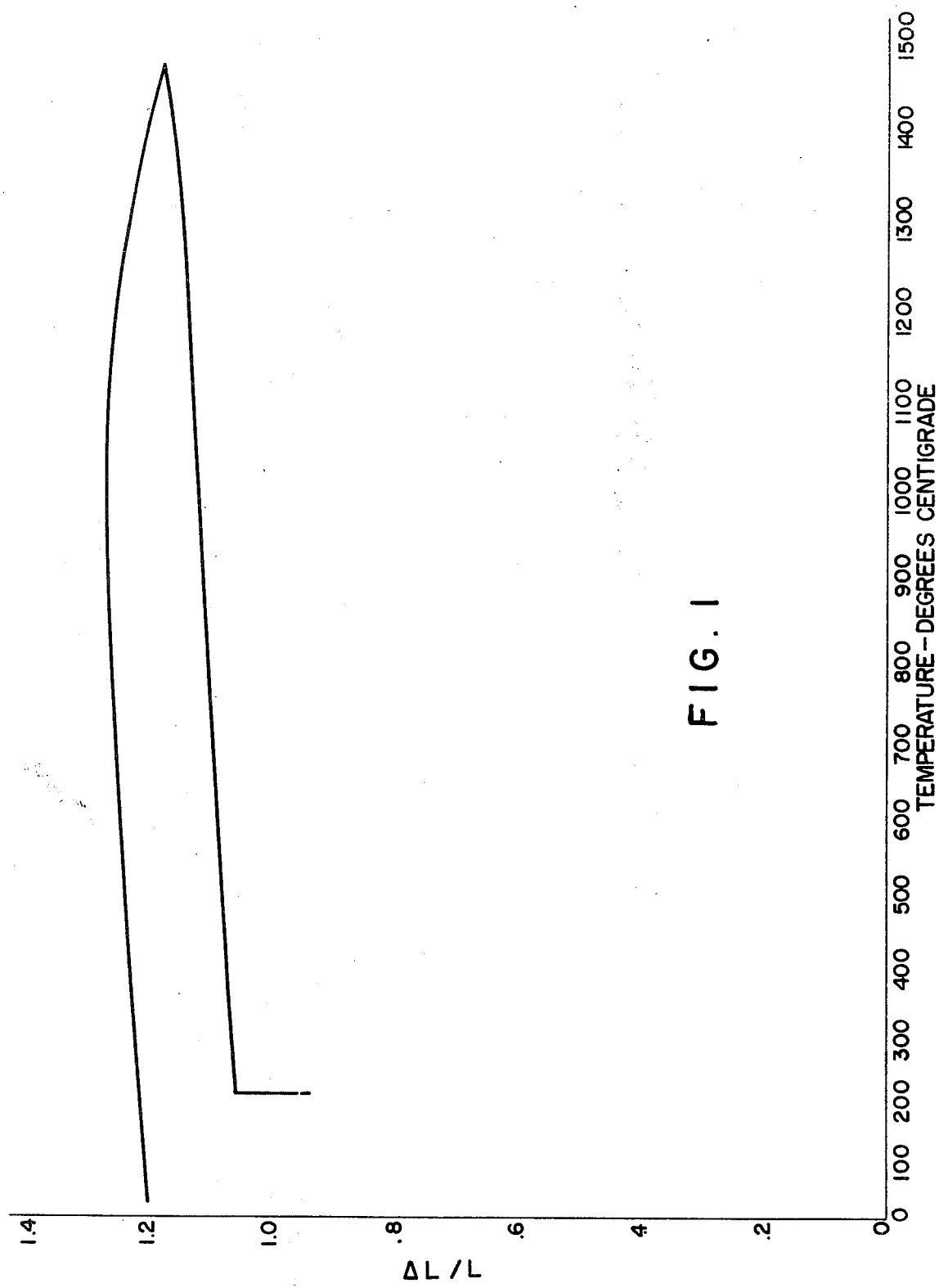
Figure 2:
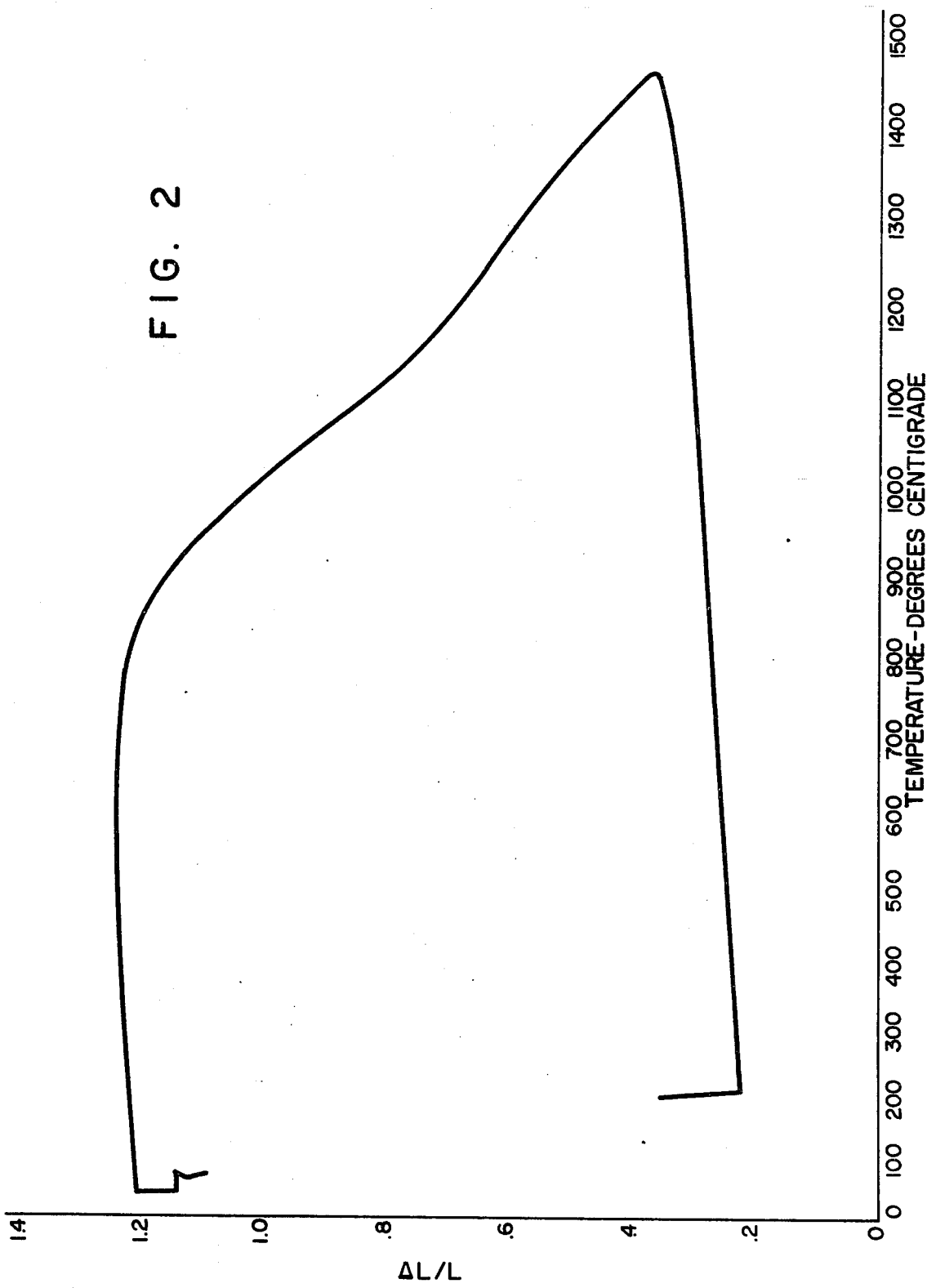
FIG. 2 is a sintering curve obtained on a yttria stabilized zirconia powder prepared by the method of Mazdiyasni et al as set forth in the above mentioned patent and which was supplied by the HTM Company under the name Zyttrite. As indicated in Example 5, after compacting and sintering, the final density of the pellets was 5.3 grams per cubic centimeter.
Figure 3:
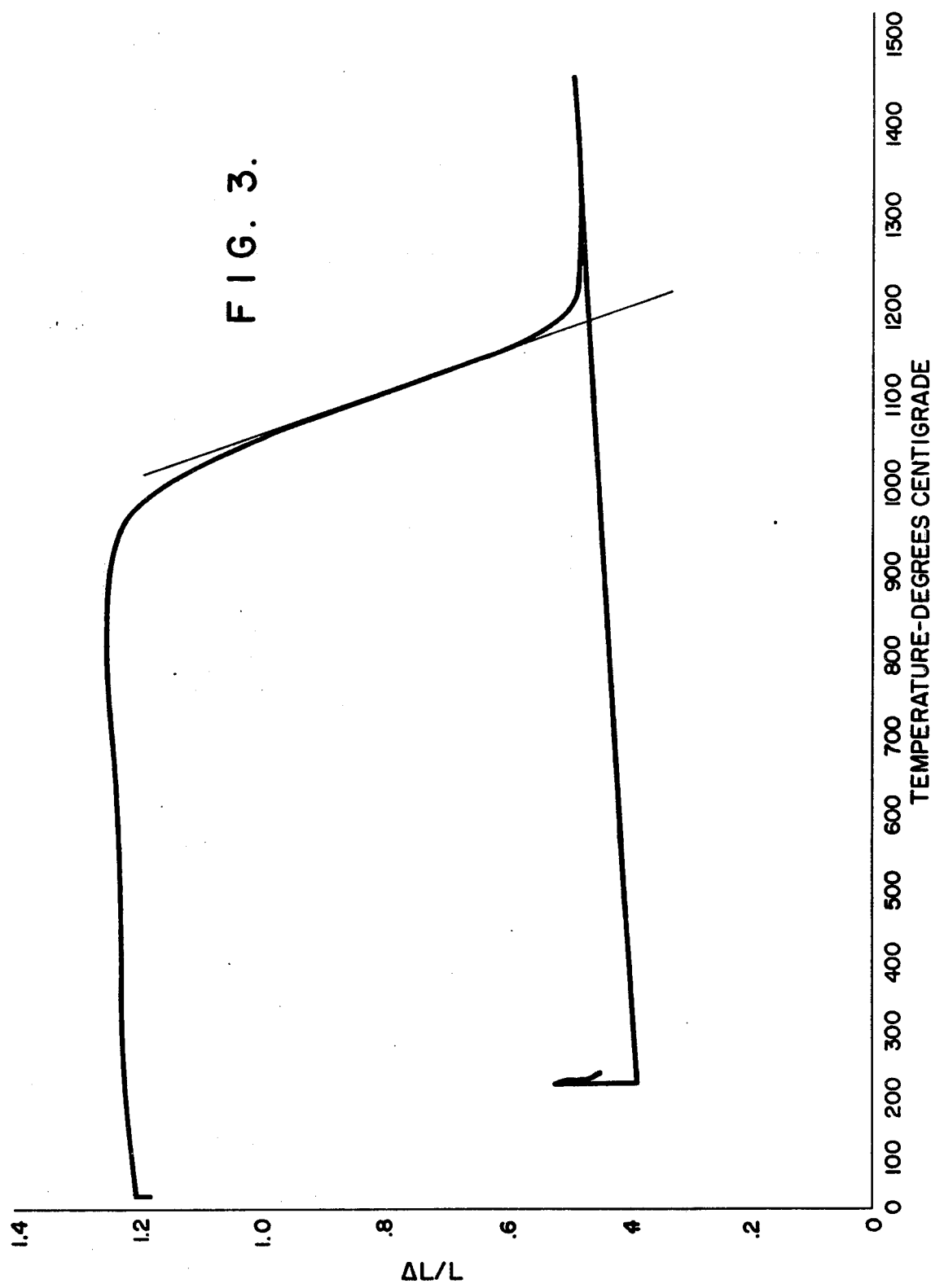
FIG. 3 is a sintering curve of a yttria stabilized zirconia powder prepared in accordance with Example 4 of this disclosure. As indicated in Example 5, the pellet sintered to near its full density, that is 5.9 – 6.0 grams per cubic centimeter.

From a comparison of FIGS. 1, 2 and 3 it is evident that the commercial zirconia products never reached their full densities even when the instrument achieved its highest temperature (1450° C). In contrast, sintered bodies prepared from the powder of this invention approached their theoretical density between 1200° and 1300° C. Hence it is evident that the powders of this invention sintered at a much lower temperature than the commercially available products.

Figure 4:

FIG. 4 is a picture obtained by scanning electron microscopy (2200 magnification) of the −325 mesh zirconia powder as received from the Zirconia Corporation of America. After compacting and sintering at 1350° C in accordance with the procedure of Example 5 the sintered body had a density of 3.68 grams per square centimeter.

Figure 5:
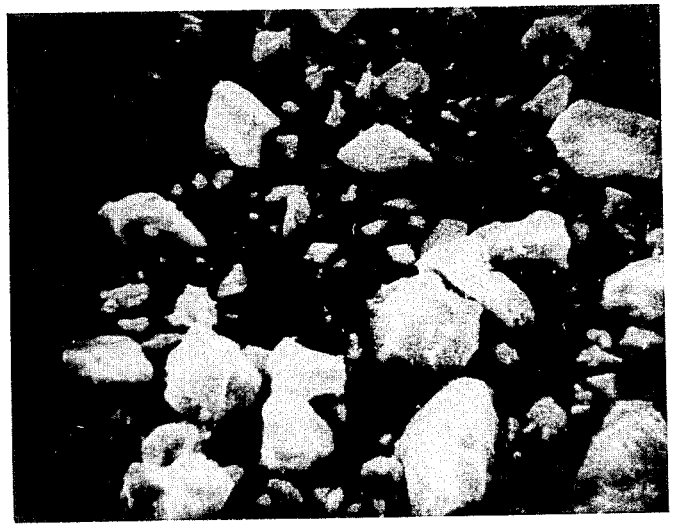

FIG. 5 is a picture (2100 magnification) of the same zirconia as shown in FIG. 4 but which had been subjected to wet ball milling. After compacting and sintering at 1350° C in accordance with the procedure of Example 5 the sintered body had a density of 3.87 grams per cubic centimeter.

Figure 6:
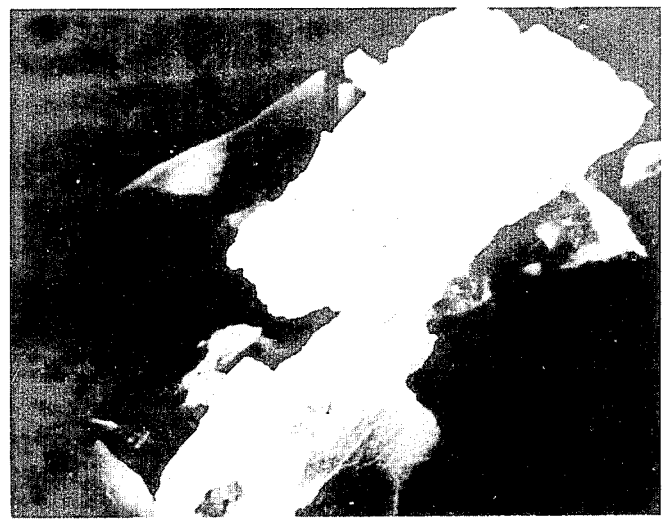

FIG. 6 is a picture (2400 magnification) of zirconia powder prepared in accordance with the teachings of Example 1 of this invention and dry ball milled. After compacting and sintering at 1350° C the sintered body had a density of 4.36 grams per centimeter.

Figure 7:
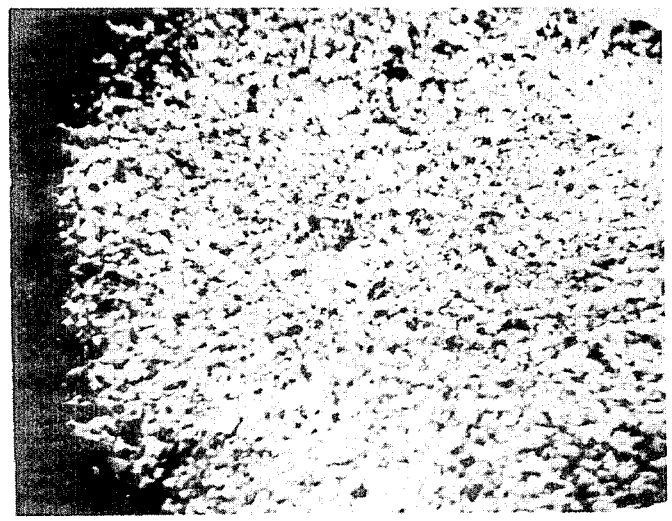

FIG. 7 is a picture (2300 magnification) of the zirconia powder shown in FIG. 6 which was re-milled under water. After compacting and sintering at 1350° C the sintered body had a density of 5.97 grams per cubic centimeter.

It is also evident from the electron microscope scans that the commercially available zirconia, does not undergo significant change in particle size even when wet ball milled and does not sinter to near its theoretical density. In contrast the fragile agglomerates prepared by the process of this invention (FIG. 6) are readily broken up into ultra fine particles (FIG. 7) which do sinter to near theoretical density.

As hereinbefore indicated the first step in the production of the finely divided metal oxide powder is contacting the metal compound with a carbohydrate material to form an intimate mixture thereof. Impregnation procedures such as the precursor process disclosed in U.S. Pat. No. 3,385,915 to B. H. Hamling can be used for the first step. The disclosure of this patent is incorporated herein by reference. Relatively inexpensive forms of carbohydrate material can be used for this step of the invention. For instance, wood pulp and cotton linters are useful inexpensive materials that can be used for the impregnation, as well as the other types of materials disclosed in said Hamling patent. Alternatively, a salt solution of the element or elements of interest can be mixed with starch or a solution of a soluble carbohydrate material such as glucose, sucrose, or hydrolyzed starch. Hence the term "contacting" as employed in the first step of the process of this invention is intended to encompass both impregnation of solids materials and dissolution in liquid materials to form intimate mixtures of the two.

The metal salts employed in the first step are compounds of one or more metals whose ashes will remain as agglomerates during the ignition step, as opposed to densifying into solid coherent, large particles which would then require fracturing during comminution rather than disruption of the aggregates as employed in the instant invention.

Examples of metals which can be employed in the process of this invention to prepare single metal oxides are beryllium, magnesium, calcium; the Group IIIB metals, i.e., scandium, yttrium and the lanthanide and actinide elements; the Group IVB metals, i.e., titanium, zirconium, and hafnium; niobium and tantalum; the Group VIB metals, i.e., chromium, molybdenum, and tungsten; manganese, iron, cobalt, nickel, copper, zinc, cadmium, aluminum, gallium, tin, lead and bismuth. The process of this invention can also be employed to prepare metal oxides which are comprised of two or more of the aforementioned metals.

In addition, it is possible to prepare metal oxides which contain at least one of the above metals and one or more additional metals. These oxides are stable and have melting points preferably above 700° C. These include the Group IA elements with the exception of hydrogen, (i.e., lithium, sodium, potassium, rubidium, cesium), strontium, barium, germanium, vanadium, rhenium, ruthenium, osmium, rhodium, indium, palladium, platinum, silver, gold, mercury, iridium, thallium, and antimony.

It should be pointed out that the sintering rates of the different metal oxides vary with the nature of the metal oxide. For example, it has been found that although the sintering rate of alumina is substantially increased when its powder is prepared according to the process of this invention, it is still much less active to sintering than zirconia powder.

Mixtures of such metal oxides with large differences in sintering rates are particularly attractive for use in the formation of sintered bodies having high surface area. In this particular case the oxide which sinters rapidly acts as a ceramic glue to hold the ultra-fine particles of the slower sintering component. A single metal oxide such as zirconia typically has a low surface area, less than 5 square meters per gram ($m^2/g$). However, when a zirconia-alumina mixed oxide is made by the above described precursor process, as indicated in Example 6, the resultant oxide mixture has a different set of properties. The alumina particles may be considered analogous to what ceramists refer to as a "grog". Because of the small particle size of the precursor prepared, less active alumina particles, the micro grog imparts high surface area to the system, while the zirconia provides strength.

The concept of a micro grog is not limited to the zirconia-alumina system, but encompasses other systems containing one or more easily sintered oxides in conjunction with one or more less easily sintered oxides. The criterion for easily sinterable and less easily sinterable oxides can be determined from dilatometric traces of the ultra-fine powders.

It has been observed that sintered articles prepared from mixed metal oxide powders such as zirconia-alumina which have a mean particle size below about 0.1 microns, are characterized by surface areas of at least 10 meters per gram and compression strengths of at least 5,000 pounds per square inch.

In practice, sintered zirconia-alumina articles having surface areas as high as 50$m^2$/gm and higher, and compressive strengths of at least 5,000 pounds per square inch are readily obtained. Moreover, it has been observed that the surface area is relatively stable over extended periods of time. For example, sintered zirconia-alumina articles having surface areas in excess of 50$m^2$/gm are stable for at least 150 hours at 950° C.

In general, it has also been observed that the component which is less easily sinterable during the preparation of the metal oxide article can be present in the article in an amount of from about 5 to about 70 weight percent. The particular range will, of course, vary somewhat depending on the particular metal oxide being prepared and the chemical properties of the two or more components employed.

For some applications where high surface area is not important but a relatively high strength is desired, the component which is less easily sinterable during preparation of the metal oxide article can be present in an amount of from about 70 to about 95 weight percent.

The metal compounds that are employed in the impregnation step are preferably water-soluble compounds such as halides, oxyhalides, nitrates, sulfates, carboxylates, and the like. Specific illustrative water soluble metal compounds include zirconyl chloride, zirconium acetate, yttrium chloride, magnesium chloride, thorium chloride, beryllium nitrate, calcium acetate, cupric chloride, strontium nitrate, barium acetate, lanthanum nitrate, aluminum chloride, titanium chloride, hafnium oxychloride, rare earth metal acetates, rare earth metal chlorides, and the like.

The preparation of the oxides of barium from inorganic halides requires that the halide ion be removed at some stage during the process. Accordingly, in the preparation of the oxides of barium, lanthanum, and other metals which form stable chloride salts, it is preferred that a different inorganic salt or an organic compound be employed as the starting material. Illustrative compounds include, among others, nitrates, alkanoates, trialkanolamines, and the like.

One preferred method of impregnation is to immerse the carbohydrate material (preferably a cellulosic polymer such as wood pulp, cotton or the like) in an aqueous solution of the metal compound(s). After immersion the loaded material is removed from the solution and the excess liquid is removed by centrifugation, squeezing, blotting, or the like. Centrifugation is a preferred method for removal of the excess liquid.

With liquid precursor compositions, e.g. solutions containing soluble carbohydrates, the preferred method is to dehydrate and char the mixture by heating. During the first stages of charring, the solution becomes progressively darker but stays clear while voluminous bubbles form. As the charring process continues, the solution turns black and very viscous until the solution is transformed into a voluminous solid char.

Although solution charring is a suitable and much recommended method of preparing the material for ignition, other methods of drying, charring and igniting the preparations would be satisfactory as well. Examples of such methods would spray drying or thin film drying following by ignition, or even direct ignition of the solution in such a way that drying, charring and igniting would be obtained in a single operation.

The second step in the production of the finely divided metal oxide is the ignition of the carbohydrate material containing the metal compound inpregnated therein. The ignition can be carried out simply by rapidly heating the loaded material in air to a temperature sufficient to ignite the carbohydrate material.

In many cases, the term "ignition" implies combustion accompanied by flame. However, flame is not necessarily present in all cases of ignition as desired in the present invention. The important factor is to effect decomposition and removal of the carbohydrate material by a method which produces fragile agglomerates of very small particles of metal compound(s) which are present in the interstices of the decomposing carbohydrate.

Thus, during the ignition step of this invention the temperature preferably should not reach the temperature at which sintering to uniform relatively non-fragile agglomerates occurs. This temperature varies from one metal oxide to another, but will normally be from about 900° C to about 1300° C. For zirconia, for example, it is desired not to exceed about 1000° C to about 1100° C. In some instances, temperature as low as 700° C or less should be employed.

The foregoing rather lengthy discussion of the ignition step should not be allowed to obscure the fact that the ingnition step can be carried as a very uncomplicated operation. For example, the ingition can be carried out by first drying the metal compound loaded material by any convenient method, followed by inserting the dried, loaded material in an oven maintained at a temperature of from about 300° C to about 900° C, and preferably from about 400° C to about 800° C. Ignition is continued until essentially all of the carbohydrate material has been removed. The time is not critical, for instance, ignition times of from about 0.5 to about 5 hours are typical.

The preparation of barium titanate powders from organo-titanium compounds offers several advantages. Of principal importance it yields barium titanate directly by ignition without the presence of any unwanted phases. The barium titanate produced is a single phase, chemically pure, and consists of very fine crystallites of high surface area and in a state of extremely fine dispersion. This process is simple, flexible in its operation, does not require any overly specialized equipment and is devoid of any difficult and time consuming operations. Although there is a lower limit in the amount of carbohydrate to be used, slight departures do not adversely affect the product. The workable range of carbohydrate concentration is wide since its upper limit is dictated more by the economics rather than by the chemistry of the process. The process is a pyrolytic process and the barium titanate powder is produced directly as a dry powder, ready for use, without the necessity for filtering and drying. The process is also flexible in terms of stoichiometry. Slight deviations from the purely stoichiometric compound are often preferred. They can easily be obtained by small compositional variations in the starting solutions without affecting the process.

When producing powdered zirconia, in many cases it is preferred to produce the zirconia powder in a stabilized form. Therefore, a compound of yttrium, calcium, magnesium, rare earth metal or other knon metals that form a stabilizer oxide can be employed along with the zirconium containing compound in producing the loaded material. The proportions of the zirconium compound and stabilizer metal compound should be selected to produce the type of stabilized zirconia desired.

After ignition, the metal oxide (which can be referred to at this point as an "ash") is comminuted to break up the fragile agglomerates to form the ultrafine powder of the invention. The comminution can be effected by any convenient method which is suitable for this purpose. Wet ball milling, is preferred although other methods for producing ultra-fine particles can be employed, if desired. It is important to note that if the process of this invention is not employed, it is very difficult to grind most solid materials to sizes finer than about 4 microns. The problems associated with grinding to small sizes are well known to those skilled in this art, and these problems have been described in detail in the literature, as, for example, in the chapter on Size Reduction by Clyde Orr, Jr. in the Kirk-Othmer "Encyclopedia of Chemical Technology", 2nd Edition, Volume 18, pages 340; 358-60.

Usually, special equipment such as fluid energy mills or colloid mills, rather than ball-mills, are needed to achieve the micron or submicron range. Even with the special equipment, obtaining submicron size is difficult. Thus, an essential feature of this invention is that incorporating an inorganic material or organometallic into a carbohydrate matrix, followed by ignition gives rise to aggregates that can be reduced to submicron sizes by conventional means. This was an unexpected result, and is distinct from the findings of B. H. Hamling as set forth in U.S. Pat. No. 3,385,915. Hamling's earlier work was directed toward the preparation of high strength fibers. Failure to follow the recommended procedure as, for example, the experiment referred to in column 15, lines 5–8 in his patent was expected to yield a material with normal size reduction properties, not a material for which size reduction was unusually easy.

The present drawings clearly show the difference between a material of normal size reduction properties and materials prepared by the process of this invention. For example, FIGS. 4 and 5 show a conventional material before and after ball-milling. There was little size reduction. FIGS. 6 and 7 are for a material prepared according to the method of this invention. FIG. 6 shows agglomerates, and FIG. 7, the same material after ball-milling. It is evident that the aggregates of FIG. 6 were broken up, but those of FIG. 4 were not. Thus, there is a clear distinction between easily disrupted aggregates and conventional particles.

The actual carrying out of the comminution step is not narrowly critical, however as indicated in the paragraph above, wet ball milling is preferred. The comminution is continued for a period of time sufficient to disrupt the fragile agglomerates into ultra-fine particles. To illustrate the physical operation involved in the comminution step, laboratory scale batches of zirconia ash have been wet ball milled (using a laboratory scale mill and 1-2 millimiter zirconia beads as the balls) to the desired ultra-fine particle size in from 4 to 8 hours. This is given merely as an illustration of one mode of carrying out the invention. When wet ball milling, it is sometimes necessary to use a non-aqueous media if the particular metal oxide undergoes hydrolysis, as is the case with alumina, magnesia, and others. Different comminution times can be encountered with other metal oxides and/or with other comminution equipment. The point to be emphasized is that metal oxides prepared by ignition of loaded carbohydrate polymers can be comminuted by conventional means to the desired ultra-fine particle size powders, whereas metal oxides prepared by other methods, such as the Hamling method, apparently cannot (at least, not with any practicable expenditure of energy).

It is sometimes advantageous to employ a particle size separation procedure after wet ball milling to separate particles that are liberated during the de-agglomeration step from aggregates that are only partially disrupted. This can be done conveniently by treatment such as those described in U.S. Pat. Nos. 2,661,287; 3,297,516 and 3,409,499 which enhance the surface charge of particles therefore permitting the formation of a colloidal dispersion. The particles prepared by the procedure of this invention are so small that settling rates are extremely slow, thus aggregates which have not been completely disrupted during wet ball milling can be separated from dispersed suspensions of liberated particles by sedimentation, centrifugation, or other separation procedures based on particle size or mass. Once the separation has been made, the liberated particles remaining in suspension can be conveniently collected by treatments that reduce the surface charge and render the colloidal suspension unstable. Typical treatments are the addition of a base to raise the pH of the suspension, or the addition of a salt having a multivalent anion. The suspensions treated in this manner revert to a flocculated condition, and in this form, the powder can be separated from the bulk of the suspending medium by filtration or sedimentation.

It has been observed that the mean particle size is below 1.0 micron, and usually below 0.1 micron. The individual particles remain unresolved at 11,000 magnification. X-ray powder diffraction analysis indicates an ultimate particle size within the range of from about 200 to about 1000 Angstroms.

One way to characterize the powder is in terms of its sinterability at temperatures substantially lower than the temperatures that have been employed with metal oxide powders heretofore available. With zirconia, for instance, after the powder has been compacted to about 40 percent of fully dense zirconia, the compacted zirconia sinters, without application of external pressure (and without the use of sintering aids), to a shape having a density of at least 90 percent of fully dense zirconia at a temperature of from about 1100° to about 1200° C.

The invention also provides sintered metal oxide bodies having strengths significantly higher than sintered metal oxide bodies heretofore available. The high strength of thse sintered bodies is apparently the direct result of the ability of the finely divided metal oxide powders of the invention to sinter at substantially lower temperatures than the prior art metal oxide powders. Because of the lower sintering temperatures, grain growth is lessened. Since strength, in many cases, bears an inverse relationship to grain size, the smaller grain size of the sintered metal oxides of the invention yields sintered bodies of higher strength. For example, sintered zirconia articles have been prepared having essentially the theoretical density of zirconia and modulus of rupture of greater than about 100,000 pounds per square inch.

The sintered metal oxide objects of the invention can be prepared by conventional sintering techniques, except that the temperatures that can be employed are significantly lower than those heretofore employed for sintering metal oxide powders. The metal oxide powders can be hot pressed, or they can be cold pressed followed by heating to sintering temperature.

The finely divided metal oxides of the invention comprise a class of known materials in a novel form, i.e. having ultra-fine particle size. The known utility (e.g. as polishing powders and as additives such as opacifiers for glass) of these metal oxides is enhanced, in many cases, by the ultra-fine particle size provided by the invention. The finely divided metal oxides of the invention can also be employed in the preparation of heat shields, and the like, by the fabrication technique described in U.S. Pat. No. 3,736,160 by B. H. Hamling entitled "Fibrous Zirconia/Cement Compositites", issued May 29, 1973. The metal oxide powders, particularly mixed metal oxide powders, are useful in the preparation of high strength compacted shapes which can be utilized in high temperature, and/or corrosive environments. High strength and high surface area sintered bodies can be utilized in the preparation of catalysts, catalyst supports an the like. The sintered metal oxide objects of the invention can also be used as refractories, crucible liners, heat shields, and the like.

The present invention is particularly attractive for the preparation of highly reactive, high surface area, powders, which are useful in commercial dielectric formulations. These formulations consists of at least two and in some cases more than four simple and mixed-cation oxides including barium titanate. As previously indicated the mixed oxides powders are obtained by contacting the cation precursors with an aqueous carbohydrate solution followed by drying, charring, and igniting. The powders can be sintered to dense bodies at lower final firing temperatures and the sintered bodies have values of dielectric constant and temperature coefficient of dielectric constant unlike those of conventional dielectrics of the same analysis.

The dielectric formulations containing the sintered powders of this invention are the subject matter of application Ser. No. 536,620, entitled "High Dielectric Constant Ceramic Body made from Fine Particle Ceramic Powders", filed Dec. 26, 1974, by R. C. F. Hanold III, and assigned to the same assignee as this invention.

The following examples illustrate the invention:

EXAMPLE 1

A typical method of producing yttria-stabilized zirconia powder is the following:

1. Contact sheets of wood pulp, by immersion, in an aqueous solution of zirconium oxy-chloride and yttrium chloride, having a specific gravity of 1.35 and containing 250 gm/liter $ZrO_2$, 20 gm/liter mixed $Y_2O_3$ and rare earth oxide and 160 gm/liter chloride ion.
2. After thorough saturation of the solution into the wood pulp, (time may vary from several minutes to a day or more) the pulp is squeezed or centrifuged to remove excess solution, i.e., solution not absorbed into the pulp.
3. The wet, salt-loaded pulp is next ignited in a commercial gas-fired incinerator. During burning the matrial reaches a maximum temperature of around 1800° F for several minutes.
4. After the charge has completely burned, the white ash is collected. The ash at this point is a soft, fluffy material composed of loosely agglomerated crystallites of stabilized zirconia. Particle sizes of the crystallites, as determined by X-ray diffraction line broadening analysis and electron microscopy, are in the 200–500 Angstrom range. The ash is next broken down to about 100 mesh size in a blender or pulverizer and then wet milled for 4 to 8 hours. Zirconia beads have been used as the grinding media in small preparations, but other hard grinding media are acceptable.

EXAMPLE 2

Ten pounds of paper grade wood pulp (Rayonier Bleached Sulfite No. 2) was soaked in 5 gal. zirconium oxychloride and yttrium chloride solution for a period of 10–15 minutes. The solution was at room temperature and had the following composition:

$ZrO_2$ — 250 gm/liter
$Y_2O_3$ — 16 gm/liter
$Cl^-$ — 163 gm/liter
Sp. Gr. — 1.350

The excess (non-impregnated) solution was removed by passing the wood pulp (in the form of sheets) through pressure rolls at 2 Tons nip pressure. After rolling, the wet pulp weighed 18.0 lbs. The pulp while still wet was placed in a commercial incinerator and ignited to ashes. A period of 4–6 hours was required to completely burn the wet pulp to ash. The white, fluffy ash weighing 2.1 lb. was collectd from the incinerator and placed in an electrically heated furnace (Blue M Electric Co.) and raised to 1830° F for a period of 3 hrs.

Next, the ash was wet milled for a period of 8 hrs. A one-gal. rubber lined ball mill was used. Milling media was zirconia beads (ZIRCOA No. 1304, −10 +20 Mesh). The milled powder was wet screened through 400 mesh screen, allowed to settle, decanted and dried at 240° F.

EXAMPLE 3

A 1.0 gram portion of the zirconia powder of Example 2 was fashioned into rectangular pellets with initial dimensions of approximately $\frac{3}{4} \times \frac{1}{4} \times \frac{1}{8}$ inches. Two such pellets were cold-pressed at approximately 18,000 psi, and sintered at 1300° C for 17 hours. After sintering, the surfaces of the pellets were polished with 600 grit diamond. Room temperature modulus of rupture values on these pellets, as determined by the three point bend test over a one-half inch span, were 134,000 and 129,000 psi. This is a 5- to 10- fold increase over the modulus of rupture values encountered for most conventional ceramic specimens.

EXAMPLE 4

An approximate 1 gram portion of yttria-stabilized zirconia powder prepared by a procedure analogous to that described in Example 2 was fashioned into a cylindrical pellet by pressing at 50,000 psi at room temperature in a steel die. A 0.5% solution of stearic acid in acetone was used as a die lubricant. The pellet was then sintered by heating in air to 1350° C over a period of approximately 20 minutes, and holding temperature for 1 hour.

|  | diameter | thickness | apparent density |
|---|---|---|---|
| After cold pressing | 1.29 cm | 0.30 cm | 2.6, g/cm$^3$ |
| After sintering | 0.97 | 0.23 | 6.0 |

EXAMPLE 5

Sheets of paper pulp were impregnated with a zirconyl chloride - yttrium chloride solution as described in Example 1. The excess solution was removed by centrifuging for 10 minutes at 4000 rpm in a 11 inch diameter basket. The wet, salt-loaded pulp was then ignited in a muffle furnace maintained at 600° C. The resultant ash was ball-milled under water using 1–2 mm diameter zirconia beads. Following ball-milling, the suspension was diluted to 3 liters and acidified was 20 ml of 1 molar acetic acid. 300 ml portions of the acidified suspension were sheared for 5 minutes in a Waring Blendor, then centrifuged for 15 minutes at 2000 rpm (mean suspension diameter, 16 inches). The material remaining in suspension was separated from the settled solids by decantation, and collected by raising the pH of the suspension to approx. pH 10 with ammonium hydroxide so as to induce flocculation. The flocculated powder was collected by centrifugation at approx. 500 rpm, and was reslurred and resettled three times in acetone so as to facilitate drying. The acetone and residual water were removed by drying in air at approx. 100° C and the yttria-stabilized zirconia powder recovered.

Pellets were prepared in the manner described in Example 4, of (a) the yttria-stabilized zirconia powder prepared by this example, (b) a yttria-stabilized zirconia powder prepared by the method of Mazolyasni, et al. which was supplied by the HTM Company under the name Zyttrite, (c) a −325 mesh yttria-stabilized zirconia powder supplied by the Zirconium Corporation of America. The pellets were sintered by heating from room temperature to 1465° C at a heating rate of 3.3° C/min. After cooling to room temperature at approximately the same rate, the final densities were as follows:

| Powder | Density, g/cm³ |
| --- | --- |
| Powder prepared by this Example. | 5.9–6.0 |
| Zyttrite | 5.3 |
| −325 mesh powder | 3.9 |

EXAMPLE 6

A solution containing zirconyl chloride and aluminum chloride each in an amount equivalent to 50 grams per liter of the respective oxides was mixed with an equal volume of Karo light corn syrup. The mixture was dried and charred by heating overnight at approx. 90° C. The resultant char was ground to −10 mesh and ignited in a muffle furnace that was maintained at 400° C. The char was ignited in increments by adding a layer consisting of 250 to 300 ml of char to a 6 × 12 inch tray about every 30 minutes. When the char addition was complete, the resultant char was held at 400° C overnight. Ball-milling, size separation, and drying was carried out in a manner analogous to that described in Example 5.

Six cylindrical pellets ⅜ inch in diameter and ¼ inch high were prepared from this powder and heated to 900° C in 45 minutes and held 2 hours. Two pellets were removed and the temperature was increased to 1000° C and maintained for 2 hours. Two more pellets were removed and the temperature was raised to 1100° C and maintained for two hours. Property data on the pellets were as follows:

| Temp. | Average Density | Average Compression Strength | Nitrogen BET Surface Area |
| --- | --- | --- | --- |
| 900° C | 1.58 g/cm³ | 10,400 psi | 87 m²/g |
| 1000 | 1.79 | 10,100 psi | 48 m²/g |
| 1100 | 1.91 | 10,000 psi | 21 m²/g |

EXAMPLE 7

Zirconia-alumina tow was prepared by the relic process as disclosed in Belgian Pat. No. 746,113. A sample of the tow was ground dry in a Mini-Blendor, and compacted into pellets in a manner similar to that described in Example 6. The pellets were heated to 1100° C at the same rate indicated in Example 6. The results obtained were as follows:

| Temperature ° C. | Density | Compressive Strength | Nitrogen BET Surface Area |
| --- | --- | --- | --- |
| 900 | 1.66 | 1,060 psi | 98 |
| 1000 | 1.92 | 1,220 psi | 52 |
| 1100 | 2.35 | 1,450 psi | 3 |

EXAMPLE 8

A solution contaning 1.8 moles per liter cupric chloride and 1.5 moles per liter aluminum chloride was mixed with an equal volume of Karo light corn syrup. The mixture was dried and charred by heating in air at approx. 90° C overnight, then ignited in a muffle furnace that was maintained at 400° C. The resultant ash was heated further at 800° C for 2 hrs., then ball-milled under water using 1 to 2 mm diameter zirconia beads. The resultant powder was collected by centrifugation, rinsed with acetone to facilitate drying, and dried in a vacuum chamber maintained at 40° C.

Cylindrical pellets of this powder were pressed at 2000 lb. force on a three-eighth inch diameter die. When heated from room temperature to 1000° C at 3° C/min., the pellets had an average density of 2.24 g/cm³, an average crush strength of 16,700 psi, and a surface area of 15.3 m²/g. X-ray diffraction showed lines characteristic of CuO (ASTM Card 5–0661) and CuO . $Al_2O_3$ (ASTM Card 2–1414).

EXAMPLE 9

Paper pulp was impregnated with an erbium chloride solution containing the equivalent of 360g $Er_2O_3$/l. The salt loaded pulp was centrifuged and ignited as described in Example 5, then heated further at 800° C for 1.5 hrs. The powder was then ball-milled under methanol using 1–2 mm diameter zirconia beads. After drying in vacuum at 40° C, a cylindrical pellet of the powder sintered to a density of 8.3 g/cm³ when heated to 1465° C at 3.3° C/min.

EXAMPLE 10

A spinel powder was prepared by impregnating paper pulp with a solution containing the equivalent of 100 g $Al_2O_3$ per liter and 40 g MgO per liter. The salt-loaded pulp was processed in a manner analogous to that described in Example 5, except the ash resulting from ignition was heated further at 800° for 1.5 hrs., and the final powder was dried in vacuum at 40° C instead of in air at 100° C. A cylindrical pellet of this material sintered to a density of 3.4 g/cm³ when heated to 1465° C at 3.3° C/min.

EXAMPLE 11

Using the procedure described above for spinel, a thoria powder was prepared starting with a thorium nitrate solution containing the equivalent of 527 g $ThO_2$/l. A cylindrical pellet of this material sintered to a density of 9.8 g/cm³ when heated to 1465° C at 3.3° C/min.

EXAMPLE 12

In a manner similar to that employed in the previous examples a mixture of 127 milliliters of $ZrOCl_2$ (342 grams $ZrO_2$/liter), 100 milliliters of $CrCl_3.6H_2O$ (1 lb./liter) 41.4 milliliters $CuCl_2.2H_2O$ (1 lb/liter) and 1 pint of Karo syrup was dehydrated on a hot plate, further dried at 95° C. for approximately 1 hour ans ignited at 600° C in air. The powder, $ZrO_2$-$Cr_2O_3$-CuO, was hand ground, rinsed with water, and dried at 100° C over the weekend. The powder was ground to 100 mesh, formed into a pellet at 6000 lb. force using a 2 inch diameter die. The pellet was then ground to 10/20 mesh.

EXAMPLE 13

The purpose of this example was to demonstrate the preparation of sub-micron size barium titanate powder. The solution used in this example was prepared in the following way: an aqueous solution of tetraisopropyl titanate was first prepared by slowly adding 100 g of tetraisopropyl titanate to 200g of glacial acetic acid with agitation. The whole solution was then added slowly to 700 g of water with agitation. The aqueous solution of tetraisopropyl titanate so prepared was then added to and thoroughly mixed with about one liter of corn syrup (Globe), 89.4g of anhydrous barium acetate were then separately dissolved in enough water to obtain complete dissolution. The barium acetate solution was then added to and thoroughly mixed with the tetraisopropyl titanate corn syrup solution. The resulting solution was then heated on a hot plate until dry. During this process, the solution was converted into a char. The resulting char was then ignited in a furnace at 600° C with an excess of air until all the carbonaceous material was burned off. The resulting powder was characterized by x-ray diffraction to be barium titanate. Its crystallite size was estimated from x-ray line broadening to be in the 510 A range.

EXAMPLE 14

The purpose of this example was to demonstrate the preparation of sub-micron size barium titanate powder. The solution used in this example was prepared in the following way: 22.22g of anhydrous barium acetate were dissolved into 50cc of water, 213.5g of corn syrup (Isomerose) were added to and thoroughly mixed with that solution, 50g of 80 wt.% triethanolamine titanate in isopropanol was then added to and thoroughly mixed with the brium acetate - corn syrup solution. In the same manner as in Example 13 the resulting solution was converted to a char, which was then ignited at 600° C in air. The resulting powder was characterized by x-ray diffraction to be barium titanate. Specific surface area of the powder was measured by B.E.T. to equal 17 m²/g. Crystallite size of the powder was estimated from x-ray line broadening to be in the 310 A range.

EXAMPLE 15

The purpose of this example was to demonstrate the preparation of sub-micron size barium titanate powder. The solution used in this example was prepared in the following way: 100g of reagent grade sucrose was dissolved in 150 cc of warm water, 22.22 g. of anhydrous barium acetate was added and dissolved into the sucrose solution, 50g of 80 wt.% triethanolamine titanate in isopropanol were then added to and thoroughly mixed with the barium acetate-sucrose solution. In the same manner as in example 13, the resulting solution was converted to a char, the char was then ignited at 600° C in air. The resulting powder was characterized by x-ray diffraction to be barium titanate. Specific surface area of the powder was measured by B.E.T. to equal 17.2 m²/g. Crystallite size of the powder was estimated from x-ray line broadening to be in the 360 A range.

EXAMPLE 16

The purpose of this example was to find out whether the carbohydrate material was necessary in the preparation of barium titanate by the method described above. The solution used in this example was prepared in the following way: 464.6g of anhydrous barium acetate was dissolved in enough water to obtain complete dissolution. The barium acetate solution was then added to and thoroughly mixed with 1 liter of 80 wt.% triethanolamine titanate in isopropanol. Upon adddition of the barium acetate solution a small amount of precipitate formed. In the same manner as in Example 13, the resulting mixture was heated on a hot plate until dry. During this process a gelatinous precipitate formed prior to the formation of the char. The resulting char was then ignited at 600° C in air. The resulting powder was characterized by x-ray diffraction to be a mixture of barium carbonate and titanium oxide.

EXAMPLE 17

The purpose of this example was to demonstrate the preparation of sub-micron size barium titanate powder containing 10% by weight calcium zirconate. The solution used in this example was prepared in the following way: 500g of commercial surcrose was dissolved into 750cc of warm water, 111.5g of anhydrous barium acetate was added and dissolved into the sucrose solution, 250g of 80wt.% triethanolamine titanate in isopropanol were then added to and thoroughly mixed with the resulting solution, 41.1cc of an aqueous solution of calcium acetate (containing 3.49g CaO) previously prepared by dissolving 955g of anhydrous calcium acetate in enough water to yield 4 liters of solution and assayed to contain 84.5g of CaO per liter of solution, were added to and thoroughly mixed with the sucrose solution; 21cc of aqueous zirconium acetate solution (containing 7.57g of $ZrO_2$) was added and thoroughly mixed with the sucrose solution. In the same manner as in Example 13, the resulting aqueous mixture was converted to a char. The char was then ignited at 600° C. The resulting powder was characterized by x-ray diffraction to be barium titanate with calcium zirconate in solid solution. Specific surface area of the powder was measured to equal 20.85 m²/g. Crystallite size of the powder was estimated from x-ray line broadening to be in the 235 A range.

EXAMPLE 18

The purpose of this example was to demonstrate the preparation of sub-micron size bariium titanate powder containing 13 wt.% bismuth titanate. The solution used in this example was prepared in the following way: 600g of commercial sucrose was dissolved in 800cc of warm water, 111.5g of anhydrous barium acetate was added to and dissolved into that solution, 278.4g of 80 wt.% triethanolamine titanate in isopropanol was then added to and thoroughly mixed with the sucrose solution, 48.2g of bismuth ammonium citrate solution, containing 11.55g of $Bi_2O_3$, was added to the sucrose solution. Upon addition of the bismuth ammonium citrate solution, a gelatinous precipitate formed which was dissolved by heating the mixture to 74° C. In the same manner as in Example 13, the resulting solution was converted to a char. The char was then ignited at 600° C in air. The resulting powder was characterized by x-ray diffraction to be barium titanate with bismuth titanate in solid solution. Specific surface area of the powder was measured to equal 18.8 m$^2$/g. Crystallite size of the powder was estimated from x-ray line broadening to be in the 270 A range.

EXAMPLE 19

The purpose of this example was to demonstrate the prepartion of sub-micron size barium titanate powder containing 9 wt.% of calcium stannate. The solution used in this example was prepared in the following way: 600g of commercial sucrose was dissolved into 750cc of warm water, 111.5g of anhydrous barium acetate was added to and dissolved into that solution, 250g of 80 wt.% triethanolamine titanate in ispropanol was then added to and thoroughly mixed with the sucrose solution, 32.6cc of calcium acetate solution, containing 2.77g of CaO, as used in Example 17, was then added to and thoroughly mixed with the sucrose solution, 350cc of glacial acetic acid containing 6.645g SnO in solution, was then added to and thoroughly mixed with the sucrose solution. In the same manner as in Example 13, the resulting mixture was converted to a char. The char was then ignited at 600° C in air. The resulting powder was characterized by x-ray diffraction to be barium titanate with calcium stannate in solid solution. Specific surface area of the powder was measured to equal 22.95 m$^2$/g. Crystallite size of the powder was estimated from x-ray line broadening to be in the 250 A range.

EXAMPLE 20

The purpose of this example was to demonstrate the preparation of sub-micron size barium titanate powder containing 11.9 wt.% bismuth titanate, 7.9 wt.% calcium stannate, 0.8 wt.% cobalt oxide and 0.2 wt.% manganese oxide. The solution used in this example was prepared in the following way: 600g of commercial sucrose was dissolved into 750cc of warm water 111.5g of anhydrous barium acetate was added to and dissolved into that solution, 0.325cc of manganous nitrate 50 wt.% solution was added to and thoroughly mixed with the sucrose solution, 278.4g of 80 wt.% triethanolamine titanate in isopropanol was then added to and thoroughly mixed with the sucrose solution, 0.86g of hydrous cobalt acetate was added to and dissolved in the sucrose solution, 48.2g of bismuth ammonium citrate solution, containing 11.55g of Bi$_2$O$_3$, was added to and thoroughly mixed to the solution in the same way as described in Example 18, 30.9cc of calcium acetate solution containing 2.62g of CaO, as used in Example 17 was added to and thoroughly mixed with the sucrose solution, 500cc of glacial acetic acid containing 5.825g Sn in solution, was then added to and thoroughly mixed with the solution. In the same manner as in Example 13 the resulting solution was converted to a char. The char was then ignited at 600° C in air. The resulting powder was characterized by x-ray diffraction to be barium titanate with the oxide additives in solid solution. Specific surface area of the powder was measured to equal 19.87 m$^2$/g. Crystallite size of the powder was estimated from x-ray line broadening to be in the 250 A range.

EXAMPLE 21

The purpose of this example was to demonstrate the preparation of sub-micron size barium titanate powder containing 2.5% by weight sodium bismuth titanate (NaBi$_9$Ti$_8$O$_{30}$). The solution used in this example was prepred in the following way: 500g of commercial sucrose was dissolved into 500cc of warm water, 104g of anhydrous barium acetate was added and dissolved into the sucrose solution, 238.26g of 80 wt.% triethanolamine titanate in isopropanol were then added to and thoroughly mixed with the resulting solution, 0.148g of anhydrous sodium acetate was added to and dissolved in the sucrose solution, 15.81g of bismuth ammonium citrate solution, containing 3.788g of Bi$_2$O$_3$, was added to and thoroughly mixed with the solution. Upon addition of the bismuth ammonium citrate solution, a gelatinous precipitate formed which was dissolved by heating the mixture to 74° C. The resulting solution was converted to a char by heating, and the char was then ignited at 600° C in air. The resulting powder was characterized by X-ray diffraction to be barium titanate with the oxide additions in solid solution. Specific surface area of the powder was measured to equal 13.04 m$^2$/g. Crystallite size of the powder was estimated from X-ray line broadening to be in the 450 A range.

EXAMPLE 22

The purpose of this example was to demonstrate the preparation of sub-micron size barium titanate powder containing 1 wt.% of chromium oxide. The solution used in this example was prepared in the following way: 220g of anhydrous barium acetate was dissolved into one liter of water, 1500g of corn syrup was added to and thoroughly mixed with the barium acetate solution, 500g of 80 wt.% triethanolamine titanate in isopropanol was then added to and thoroughly mixed with the resulting solution; the resulting solution was then divided into two equal parts and 3.25g of chromium acetate was added to and dissolved into one of the equal parts. The resulting solution was converted to a char by heating and the char was then ignited at 600° C in air. The resulting powder was characterized by X-ray diffraction to be barium titanate doped with chromium oxide. Specific surface area of the powder was measured to equual 7.72 m$^2$/g. Crystallite size of the powder was estimated from X-ray line broadening to be in the 600 A range.

EXAMPLE 23

The purpose of this example was to demonstrate the preparation of sub-micron size calcium zirconate powder. The solution used in this example was prepared in the following way: a solution of calcium acetate was first prepared by dissolving approximately 955g of monohydrated calcium acetate in enough water to yield approximately 4 liters of solution which was assayed to contain the equivalent of 84.85 g of CaO per liter; 661 cc of the calcium acetate solution containing 56 g of CaO and 338 cc of commercial zirconium acetate solution assayed to contain the equivalent of 364.6g of ZrO$_2$ per liter and containing the equivalent of 123.25g of ZrO$_2$ were added and thoroughly mixed with one liter of corn syrup. The resulting solution was converted to a char by heating and the char was then ignited at 650° C in air. The resulting powder was characterized by X-ray diffraction to be calcium zirconate with a small amount of zirconia and calcia as separate phases. Specific surface area of the powder was measured to equal 14.5 m$^2$/g.

EXAMPLE 24

The purpose of this example was to demonstrate the preparation of sub-micron size potassium tantalate niobate powder. The solution used in this example was prepared in the following way: 50cc of tantalum oxalate solution, containing the equivalent of 0.023 mole tantalum pentoxide, 75cc of niobium oxalate solution containing the equivalent of 0.023 mole niobium pentoxide and 6.35g of potassium carbonate corresponding to 0.046 mole of potassium oxide were mixed together with 200cc of corn syrup. Upon mixing, a precipitate formed which was dissolved by addition of oxalic acid. The resulting solution was converted to a char by heating and the char was then ignited at 600° C in air. The resulting powder was characterized by X-ray diffraction to be potassium tantalate-niobate solid solution, having the perovskite structure. Specific surface area of the powder was measured to equal 8.25 m²/g.

EXAMPLE 25

In a similar manner to that employed in the previous examples, a series of experiments were conducted to illustrate the preparation of other metal oxides. In all cases, a water soluble cation salt was dissolved in a solution containing 4 or more grams of sugar per gram of anticipated oxide yield and the solution was dried, charred, and ignited. The results of this series are summarized in Table I.

TABLE I

| | Oxide | Starting Solution | Ignition Temp. | Surface Area |
|---|---|---|---|---|
| 1 | CdO | Cadmium Acetate, Sugar | 400° C | 3 m²/g |
| 2 | CdO | Cadmium Acetate, EDTA* (complexing agent), Sugar | 400° C | 2.9 m²/g |
| 3 | $Bi_2O_3$ | Bismuth Ammonium Citrate Sugar | 475° C | 1.0 m²/g |
| 4 | $Bi_2O_3$ | Bismuth Ammonium Citrate, Sugar | 400° C | 5.6 m²/g |
| 5 | $ZrO_2$ | Zirconium Acetyl Acetate, Corn Syrup | 650° C | 29.0 m²/g |
| 6 | $Ta_2O_5$ | Tantalum-Citric Acid Solution**, Sugar | 600° C | 43.1 m²/g |
| 7 | $Ta_2O_5$ | Tantalum-Citric Acid Solution**, Sugar | 600° C | 108.4 m²/g |

*Ethylenediamine tetra-acetic acid.
**Made by dissolving freshly precipitated $Ta_2O_5$ in a citric acid-hydrogen peroxide mixture.

In each case, the desired oxide, free of detectable quantities of second phases was obtained directly from ignition and identified by analysis.

EXAMPLE 26

A further series of experiments were conducted in accordance with the teachings of the previous examples to illustrate the versatility of the invention in the manufacture of diverse mixed oxides in highly reactive, high surface area forms. The results of this series are summarized in Table II.

TABLE II

| | Oxide | Starting Materials | Stoichiometry | Surface Area |
|---|---|---|---|---|
| 1 | $CaSnO_3$ | Stannous Acetate, Sugar, Calcium Acetate | 1.19 | 40.5 m²/g |
| 2 | $CaSnO_3$ | Stannous Tartrate dissolved in acetic acid solution, sugar, Calcium Acetate | 0.91 | 25.1 m²/g |
| 3 | $CaSnO_3$ | Stannous Acetate, Sugar, Calcium Acetate | 0.84 | 15.1 m²/g |
| 4 | $Bi_2O_3 \cdot 2TiO_2$ | Bismuth Ammonium Citrate, Sugar, Tyzor TE* | 1.96 | 10.3 m²/g |
| 5 | $Bi_2O_3 \cdot 2TiO_2$ | Bismuth Ammonium Citrate, Sugar, Tyzor TE* | 2.01 | 7.9 m²/g |
| 6 | $Bi_2O_3 \cdot 2TiO_2$ | Bismuth Ammonium Citrate, Sugar, Tyzor TE* | | 23.5 m²/g |
| 7 | $CaZrO_3$ | Calcium Acetate, Corn Syrup, Zirconium Nitrate | | 32.9 m²/g |
| 8 | $CaZrO_3$ | Calcium - EDTA Complex, Sugar, Zirconium Acetyl Acetate | | 22.1 m²/g |
| 9 | $CaZrO_3$ | Zirconium Acetyl Acetate-Complex with Triethanolamine, Sugar, Calcium Acetate | | 46.8 m²/g |
| 10 | $Nd_2O_3 \cdot 2TiO_2$ | Neodymium Acetate, Sugar, Tyzor TE* | 2.042 | 25.1 m²/g |

*DuPont tradename for tetraethanolamine titanate in isopropyl alcohol.

EXAMPLE 27

The purpose of this example was to demonstrate the preparation of sub-micron size strontium hexaferrite powder. The solution used in this example was prepared in the following way: 96.96g of hydrated ferric nitrate and 6.88g of anhydrous strontium nitrate were dissolved into 200cc of water. 200cc of corn syrup was added to and thoroughly mixed with this solution. The resulting solution was converted to a char by heating, and the char was then ignited at 400° C in air. The resulting powder was characterized by X-ray diffraction to be strontium ferrite. Specific surface area of the powder was measured to equal 21.25 m²/g.

EXAMPLE 28

The purpose of this example was to demonstrate the preparation of sub-micron size strontium hexaferrite powder. The solution used in this example was prepared from ferric nitrate and strontium nitrate and was assayed to contain the equivalent of 11.23g/l of SrO and 99.31g/l of $Fe_2O_3$. Its specific gravity was measured to be 1.262g/cc.

Sheets of paper pulp were soaked for several hours in this solution. The excess solution was then removed by subjecting the wet sheets to centrifugation. The impregnated sheets of paper pulp were then ignited in air by burning them in a tray. The resulting powder was characterized by X-ray diffraction to be single phase strontium ferrite. Specific surface area of the powder was measured to equal 34.7 m²/g. Crystallite size of the powder was estimated from X-ray line broadening to be in the 900 A range.

EXAMPLE 29

The purpose of this example was to demonstrate the preparation of sub-micron size barium hexaferrite powder. The solution used in this example was prepared from ferric nitrate and barium nitrate, and contained the equivalent of 42.75g/l of $Fe_2O_3$ and 6.89g/l of BaO.

Sheets of paper pulp were soaked for several hours in this solution. The excess solution was then removed by subjecting the wet sheets to centrifugation. The impregnated sheets of paper pulp were then ignited in air by burning them in a tray. The resulting powder was characterized by X-ray diffraction to be single phase barium ferrite. Specific surface area of the powder was measured to equal 22.7 m²/g.

EXAMPLE 30

The purpose of this example was to demonstrate the preparation of sub-micron size W-phase ferrite powder - $SrO \cdot 2 MgO \cdot 8 Fe_2O_3$. The solution used in this example was prepared in the following way: 981.5cc of ferric nitrate solution containing the equivalent of 123.28g ferric oxide and 50cc of strontium nitrate solution containing the equivalent of 19g strontium oxide were mixed together. 50g of magnesium nitrate corresponding to 7.78g of magnesium oxide was added and dissolved in this solution.

Sheets of paper pulp were soaked for several hours in the solution. The excess solution was then removed by subjecting the wet sheets to centrifugation. The impregnated sheets of paper pulp were then ignited in air. A mild ignition was achieved by letting the sheets burn in an open tray. The resulting powder was characterized by X-ray diffraction to be composed of small crystallites of W-phase ferrite. Specific surface area of the powder was measured to equal 46.54 m$^2$.

EXAMPLE 31

The purpose of this example was to demonstrate the preparation of sub-micron size barium hexaferrite powder. The solution used in this example was prepared in the following way: 100g of ferrous gluconate was dissolved in 500cc of warm water, 5.2g of barium acetate was then added to and dissolved in the solution, 500cc of corn syrup was then added to and thoroughly mixed with the solution. The resulting solution was converted to a char by heating and the char was then ignited at 600° C in air. The resulting powder was characterized by X-ray diffration to be single phase barium ferrite. Specific surface area of the powder was measured to equal 39.6 m$^2$/g.

Although the invention has been illustrated by the preceding examples, it is not to be construed as being limited to the materials employed therein, but rather, the invention relates to the generic area as hereinbefore disclosed. Various modifications and embodiments thereof can be made without departing from the spirit and scope thereof.

What is claimed is:

1. Process for producing finely divided metal oxygen-containing compounds which comprises:
   a. contacting a carbohydrate material with at least one compound of a metal to form an intimate mixture thereof;
   b. introducing said mixture into a heating zone having a temperature sufficient to ignite said mixture but insufficient to substantially sinter said metal compound;
   c. igniting said mixture in said heating zone for a time period sufficient to decompose and remove said carbohydrate material and produce easily disrupted agglomerates of submicron size metal oxygen-containing particles;
   d. disrupting said agglomerates without substantially reducing the size of the individual particles which comprised said agglomerates to produce finely divided metal oxygen-containing compounds having a mean particle size below one micron.

2. The process of claim 1 wherein said carbohydrate material is cellulosic.

3. The process of claim 1 wherein said carbohydrate material is wood pulp.

4. The process of claim 1 wherein said carbohydrate material is cotton.

5. The process of claim 1 wherein said carbohydrate material is a sugar.

6. The process of claim 5 wherein said sugar is sucrose.

7. The process of claim 5 wherein said sugar is invert syrup.

8. The process of claim 1 wherein said metal oxygen-containing compound is a metal oxide.

9. The process of claim 1 wherein said metal oxygen-containing compound is a ferrite.

10. The process of claim 1 wherein said oxygen-containing compounds are comprised of at least one metal which is selected from the group consisting of beryllium, magnesium, calcium, the Group III B metals, the Group IV B metals, niobium, tantalum, the Group VI B metals, manganese, iron, cobalt, nickel, copper, zinc, cadmium, aluminum; gallium, tin, lead and bismuth.

11. The process of claim 1 wherein said oxygen-containing compounds are comprised of at least one metal which is selected from the group consisting of beryllium, magnesium, calcium, the Group IIIB metals, the Group IVB metals, niobium, tantalum, the Group VIB metals, manganese, iron, cobalt, nickel, copper, zinc, cadmium, aluminum, gallium, tin, lead and bismuth, and at least one additional metal selected from the group consisting of lithium, sodium, potassium, rubidium, cesium, strontium, barium, germanium, vanadium, ruthenium, osmium, rhodium, indium, iridium, thallium and antimony.

12. Process of claim 1 wherein in step (a), said metal compound comprises an aqueous solution of a zirconium compound.

13. Process of claim 12 wherein said aqueous solution of a zirconium compound also contains dissolved therein a compound of a metal that forms an oxide that stabilizes zirconia.

14. Process of claim 13 wherein said metal that forms an oxide that stabilizes zirconia is yttrium.

15. Process of claim 12 wherein the zirconia is comminuted by wet ball milling.

16. Process of claim 12 wherein said aqueous solution of a zirconium compound also contains dissolved therein at least one copper and at least one chromium compound that forms an oxide.

17. Process of claim 1 wherein in step (a), said metal compounds comprise at least one barium and one titanium compound, said mixture being essentially free of chloride ions.

18. A process for the preparation of submicron barium titanate powders which process comprises the steps of:
   a. contacting a water soluble carbohydrate with an aqueous acidic solution of a tetraalkyl titanate and an aqueous solution of barium alkanoate, to form an intimate mixture thereof, said mixture being essentially free of chloride ions,
   b. introducing said mixture into a heating zone having a temperature sufficient to ignite said mixture but insufficient to substantially sinter said barium titanate compound;
   c. igniting said mixture in said heating zone for a time period sufficient to decompose and remove said carbohydrate material and produce easily disrupted agglomerates of sub-micron size barium titanate particles,
   d. disrupting said agglomerates without substantially reducing the size of the individual particles which comprised said agglomerates to produce finely divided barium titanate powder having a mean particle size below one micron.

19. The process of claim 17 wherein said barium and titanium compounds are organic compounds.

20. The process of claim 17 wherein said barium compound is barium acetate.

21. The process of claim 17 wherein said titanium compound is triethanolamine titanate.

22. The process of claim 17 wherein said titanium compound is tetraisopropyl titanate.

23. The process of claim 17 wherein said barium titanate also contains other metal oxides.

24. A process for producing a sintered article comprised of a metal oxide which is sinterable to essentially its theoretical density at low temperatures, sid article having a compressive strength of at least 5,000 pounds per square inch, which process comprises:
 a. contacting a carbohydrate material with a compound of a metal to form an intimate mixture thereof;
 b. introducing said mixture into a heating zone having a temperature sufficient to ignite said mixture but insufficient to substantially sinter said metal compound;
 c. igniting said mixture in said heating zone for a time period sufficient to decompose and remove said carbohydrate material and produce easily disrupted agglomerates of metal oxide particles of sub-micron size,
 d. disrupting sid agglomerates without substantially reducing the size of the individual particles which comprised said agglomerates to produce finely divided metal oxide powder having a mean particle size of less than 0.1 micron,
 e. shaping and compacting said powder into the form of said article, and
 f. sintering said shaped article at a temperature and for a period of time sufficient to form said article.

25. A process for producing a sintered article comprised of zirconia essentially at its theoretical density, said article having a compressive strength of at least 5,000 pounds per square inch, which process comprises:
 a. contacting a carbohydrate material with a compound of zirconium to form an intimate mixture thereof;
 b. introducing said mixture into a heating zone having a temperature sufficient to ignite said mixture but insufficient to substantially sinter said zirconium compound;
 c. igniting said mixture in said heating zone for a time period sufficient to decompose and remove said carbohydrate material and produce easily disrupted agglomerates of zirconia particles of sub-micron size,
 d. disrupting said agglomerates without substantially reducing the size of the individual particles which comprised the agglomerates to produce finely divided zirconia powder having a mean particle size of less than 0.1 micron,
 e. shaping and compacting said powder into the form of said article, and
 f. sintering said shaped article, at a temperature and for a period of time sufficient to form said article.

26. A process for producing a sintered article comprised of thoria essentially at its theoretical density, said article having a compressive strength of at least 5,000 pounds per square inch, which process comprises:
 a. contacting a carbohydrate material with a compound of thorium to form an intimate mixture thereof;
 b. introducing said mixture into a heating zone having a temperature sufficient to ignite said mixture but sufficient to substantially sinter said thorium compound;
 c. igniting said mixture in said heating zone for a time period sufficient to decompose and remove said carbohydrate material and produce easily disrupted agglomerates of thoria particles of sub-micron size,
 d. disrupting said agglomerates without substantially reducing the size of the individual particles which comprised the agglomerates to produce finely divided thoria powder having a mean particle size of less than 0.1 micron,
 e. shaping and compacting said powder into the form of said article, and
 f. sintering said shaped article, at a temperature and for a period of time sufficient to form said article.

27. The sintered article comprised of thoria prepared by the process of claim 26.

28. A process for producing a sintered article comprised of erbia essentially at its theoretical density, said article having a compressive strength of at least 5,000 pounds per square inch, which process comprises:
 a. contacting a carbohydrate material with a compound of erbium to form an intimate mixture thereof;
 b. introducing said mixture into a heating zone having a temperature sufficient to ignite said mixture but insufficient to substantially sinter said erbium compound;
 c. igniting said mixture in said heating zone for a time period sufficient to decompose and remove said carbohydrate material to produce easily disrupted agglomerates of erbia particles of sub-micron size,
 d. disrupting said agglomerates without substantially reducing the size of the individual particles which comprised the agglomerates to produce finely divided erbia powder having a mean particle size of less than 0.1 micron,
 e. shaping and compacting said powder into the form of said article, and
 f. sintering said shaped article, at a temperature and for a period of time sufficient to form said article.

29. A sintered article comprised of erbia prepared by the process of claim 28.

30. A process for producing a sintered article comprised of two or more metal oxides, said article having a surface area which is at least 10 square meters per gram, and a compressive strength of at least 5,000 pounds per square inch, which process comprises:
 a. contacting a carbohydrate material with two or more compounds of a metal to form an intimate mixture thereof;
 b. introducing said mixture into a heating zone having a temperature sufficient to ignite said mixture but insufficient to substantially sinter said metal compounds;
 c. igniting said mixture in said heating zone for a time period sufficient to decompose and remove said carbohydrate material and produce easily disrupted agglomerates of metal oxide particles of sub-micron size, at least some of which metal oxide particles are sinterable;
 d. disrupting said agglomerates without substantially reducing the size of the individual particles which comprised said agglomerates to produce finely divided metal oxide powder having a mean particle size of less than 0.1 micron,
 e. shaping and compacting said powder into the form of said article, and
 f. sintering said shaped article, at a temperature and for a period of time sufficient to form said article.

31. The process of claim 30 wherein said sintered article is comprised of the oxides of zirconium and aluminum.

32. The process of claim 31 wherein said oxide of aluminum is present in an amount of from about 5 to about 70 weight percent.

33. The process of claim 30 wherein said sintered article is comprised of the oxides of copper and aluminum.

34. The process of claim 33 wherein said oxide of aluminum is present in an amount of from about 5 to about 70 weight percent.

35. A sintered article comprised of the oxides of copper and aluminum, said article being prepared by the process of claim 30.

36. The sintered article of claim 35 wherein aid oxide of aluminum is present in an amount of from about 5 to about 70 weight percent.

* * * * *